United States Patent [19]

Humphrey et al.

[11] 4,416,059

[45] Nov. 22, 1983

[54] WIRE INSERTION TOOL

[75] Inventors: John W. Humphrey, Eden Prairie; Raymond A. Silbernagel, Ramsey, both of Minn.

[73] Assignee: Magnetic Controls Company, Minneapolis, Minn.

[21] Appl. No.: 332,179

[22] Filed: Dec. 18, 1981

[51] Int. Cl.³ .............................................. B23P 19/02

[52] U.S. Cl. .......................................... 29/751; 7/107; 29/278; 29/758; 81/9.5 R; 140/123

[58] Field of Search ................. 29/751, 761, 715, 736, 29/753, 788, 796, 750, 752, 758, 564.4, 566.4, 278, 280; 140/102.5, 106, 123, 124; 7/107; 81/9.5 R, 9.5 C, 9.51; 339/97 R

[56] References Cited

U.S. PATENT DOCUMENTS

| | | | |
|---|---|---|---|
| 2,807,810 | 10/1957 | Belek et al. | 140/124 |
| 2,937,669 | 5/1960 | Lemke | 140/124 |
| 3,361,015 | 1/1968 | Matthews | 81/9.5 C |
| 3,713,215 | 1/1973 | Van Dalen et al. | 7/107 |
| 3,967,661 | 7/1976 | Scoville et al. | 140/124 |
| 4,283,105 | 8/1981 | Ferrill et al. | 339/97 R |
| 4,329,777 | 5/1982 | Murphy | 29/751 |

FOREIGN PATENT DOCUMENTS

| | | | |
|---|---|---|---|
| 1285664 | 8/1972 | United Kingdom | 81/9.5 R |

OTHER PUBLICATIONS

Schechter, R., Tool for Wrapping Wire on Terminals of Different Sizes, Western Electric Technical Digest, No. 44, p. 47, Oct. 1976.

*Primary Examiner*—Carl E. Hall
*Assistant Examiner*—P. W. Echols
*Attorney, Agent, or Firm*—Dorsey & Whitney

[57] ABSTRACT

A wire insertion tool usable for inserting a wire into a split cylinder connector. The tool includes a central rod portion, a sleeve portion spaced outwardly from the rod portion and at least a pair of openings in the side wall of the sleeve portion to provide the tool with a self cleaning feature.

15 Claims, 9 Drawing Figures

FIG. 4
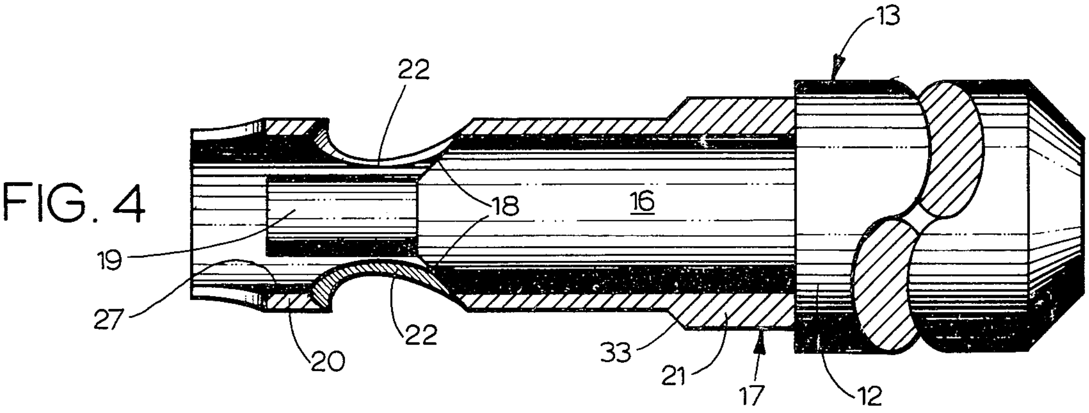
FIG. 6
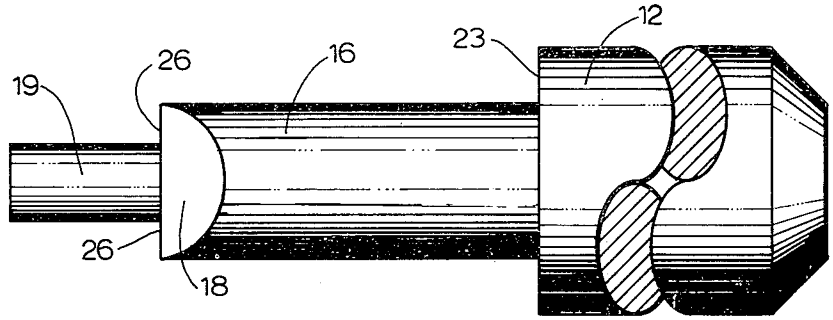
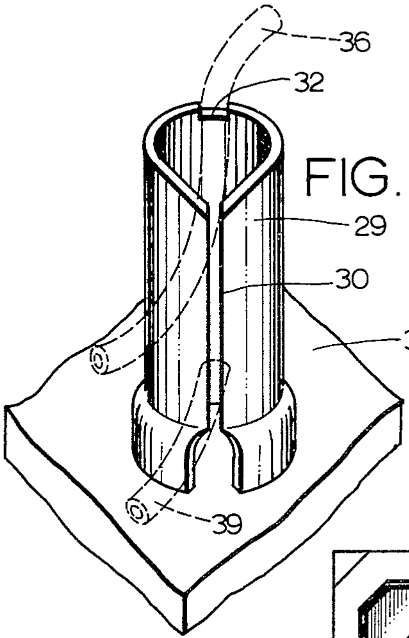
FIG. 7
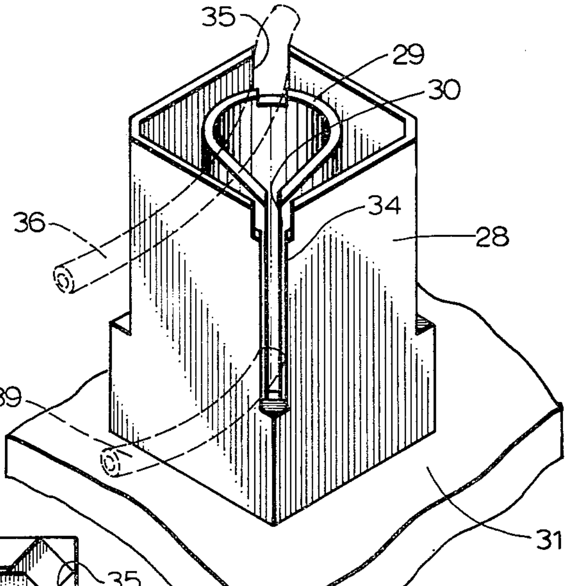
FIG. 8
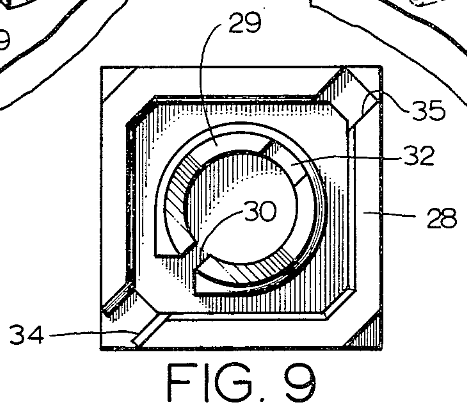
FIG. 9

WIRE INSERTION TOOL

BACKGROUND OF THE INVENTION

The present invention relates generally to a wire insertion tool, and particularly, to a wire insertion tool usable to insert a jumper or connecting wire into a split cylinder type connector.

Split cylinder connectors are one of many types of connectors usable in the telecommunications or electronics industry to terminate, provide access to and interconnect electrical circuits. A split cylinder connector comprises a generally tubular configuration having an elongated slot for insertion of a connecting wire. During insertion of the wire, the edges of the slot cut through the insulation portion of the wire and make electrical contact with the central conductor portion of the wire. In the prior art, insertion tools have been utilized to force the connector wire into the slot. A problem which has existed with these prior art insertion tools is the build up or accumulation of tiny bits of wire cuttings and the like within the tool head or tip. These wire cuttings result from the cutting of the wire by the slot edges. After extensive use of the tool (normally between about 50–100 insertions), this build up interferes with the operability of the tool, thus requiring the tool head to be either cleaned or discarded on a regular basis. This is particularly time consuming considering the fact that some installations can require several thousand insertions. Accordingly, a need exists in the art for a wire insertion tool of the type described above which overcomes the problems resulting from the build up or accumulation of wire cuttings.

SUMMARY OF THE INVENTION

In contrast to the prior art, the present invention relates to a wire insertion tool for use in inserting a wire into a split cylinder connector which includes a self cleaning feature. More specifically, the tool includes a centrally disposed rod portion with a size and configuration adapted for insertion into the split cylinder connector. The tool also includes an exterior sleeve surrounding the rod portion and having a bore spaced outwardly from the rod to define an opening for receiving the split cylinder connector. The sleeve includes at least a pair of closed loop openings in its side wall to allow wire cuttings and other fragments to pass through the openings and away from the tip. This prevents accumulation or build up of such cuttings within the tip itself and overcomes the deficiency of tools in the prior art which had to be periodically cleaned or discarded. The interior rod also includes a shoulder portion having a beveled surface joining with the openings in the side wall of the sleeve to assist in guiding the wire cuttings, etc. through the openings.

Accordingly, it is an object of the present invention to provide an improved wire insertion tool for use with split cylinder connectors.

Another object of the present invention is to provide an improved wire insertion tool for use with split cylinder connectors which includes a self cleaning feature to prevent the build up of wire cuttings, etc. in the tip.

A further object of the present invention is to provide an improved wire insertion tool for use with split cylinder connectors wherein the self cleaning feature includes at least a pair of openings in the side wall of the sleeve portion to prevent build up of wire cuttings.

These and other objects of the present invention will become apparent with reference to the drawings, the description of the preferred embodiment and the appended claims.

DESCRIPTION OF THE DRAWINGS

FIG. 4 is a sectional view as viewed along the section line 4—4 of FIG. 3.

FIG. 6 is an elevational side view of the inner rod portion of the wire insertion tool of the present invention.

FIG. 7 is a pictorial view of a split cylinder connector with which the tool of the present invention is adapted for use.

FIG. 8 is a pictorial view of a split cylinder connector and housing combination with which the tool of the present invention is adapted for use.

FIG. 9 is an elevational top view of the split cylinder connector and housing of FIG. 8.

DESCRIPTION OF THE PREFERRED EMBODIMENT

Figure 1:
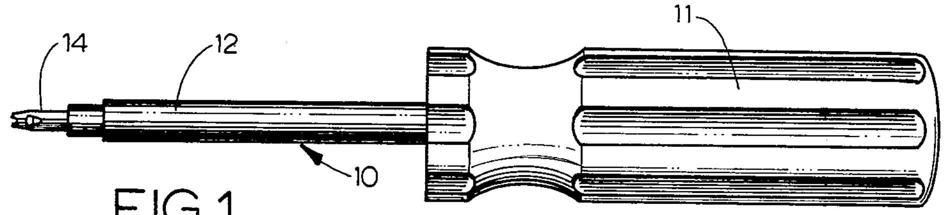
FIG. 1 is an elevational side view of the wire insertion tool of the present invention.

Reference is first made to FIG. 1 in which the wire insertion tool is indicated generally by the reference numeral 10. The tool 10 includes a handle 11, an elongated shank 12 and a tip 14. The handle 11 can be similar to the handle of a conventional screw driver as shown or can include spring or impact means for providing an insertion force to the shank 12 and tip 14. In the preferred embodiment, one end of the shank 12 is pressed into the handle 11 with the other end extending outwardly therefrom. The tip 14 is connected to the other end of the shank 12.

Figure 2:
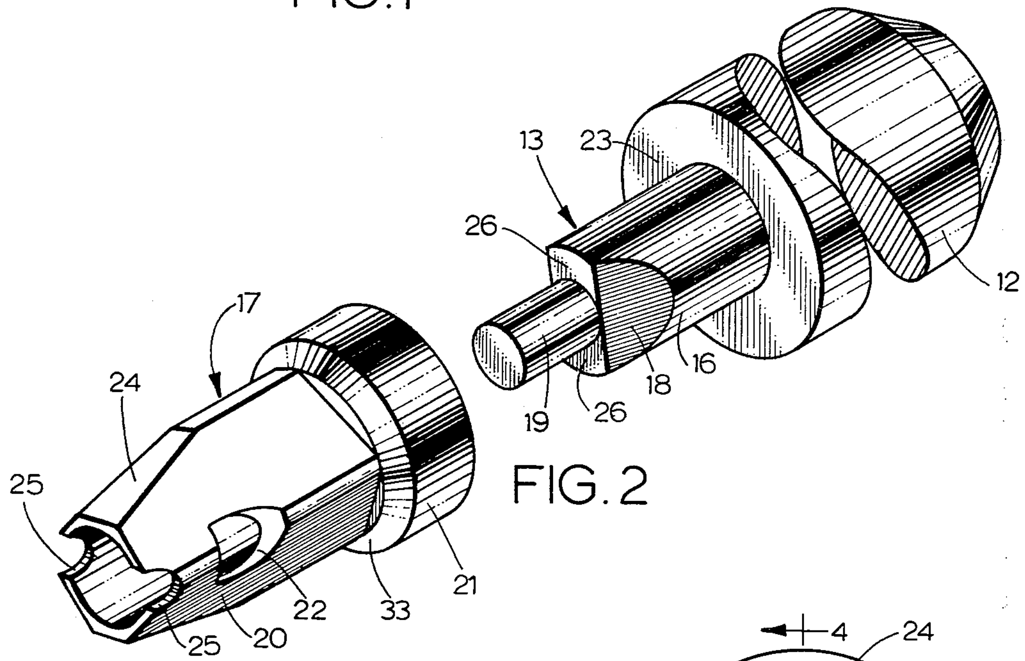
FIG. 2 is a pictorial, broken apart view showing the rod and sleeve portions of the wire insertion tool of the present invention.

Reference is next made to FIGS. 2–6 showing various views of the elements forming the tip portion of the wire insertion tool. As illustrated specifically in FIG. 2, the tip portion includes an inner rod section 13 and an outer sleeve section 17. FIG. 2 shows the rod and sleeve sections separated, although when assembled, the rod 13 is positioned within the sleeve 17 in the manner illustrated in FIG. 4 and retained therein by a press fit engagement or other connecting means.

The rod section 13 includes a cylindrically shaped, forward wire engaging rod portion 19, a cylindrically shaped intermediate rod portion 16 and a cylindrically shaped end section or shank 12. As will be described in greater detail below, the forward end of the portion 19 is adapted for engagement with the jumper or connecting wire during the insertion procedure. The rearward end of the portion 19 is connected with the forward end of the intermediate portion 16 by a shoulder portion illustrated best in FIGS. 3 and 6. As shown in FIG. 6, the shoulder portion includes a pair of diametrically opposite, flat surfaces 26, 26 disposed at right angles with respect to the portions 19 and 16. The purpose of the flat surfaces 26, 26 is to seat against the top of the split cylinder. This seating defines the end position of the insertion movement. As shown best in FIGS. 2, 3, 4 and 6, diametrically opposite sides of the shoulder portion are beveled to form a pair of beveled surfaces 18, 18. When inserted into the sleeve portion 17 as shown in FIG. 4, these beveled surfaces 18, 18 are aligned with the closed loop openings 22, 22 in the side wall of the sleeve 17 to provide the self cleaning feature of the present invention. As also illustrated in FIG. 4, the angle of these beveled surfaces 18, 18, as well as the angle of the openings 22, 22 is preferably about 45° with respect to the longitudinal axis of the rod portion 19. It should also be noted that the beneficial feature of the present invention can be achieved with the openings being disposed at right angles with respect to the rod portion 19 as well as angles other than 45°.

The rearward end of the intermediate portion 16 is connected with the forward end of the shank portion 12 by the right angle shoulder 23. The shank 12 in turn is connected with the handle 11 (FIG. 1). As described earlier, this connection is by a press fit.

The sleeve 17 includes a forward section 20 and a rearward, generally cylindrical section 21 which are joined by the shoulder 33. As illustrated best in FIGS. 4 and 5, the sleeve 17 includes an elongated cylindrical bore 27 extending through its entire length. The inner dimension of this bore 27 approximates the outer dimension of the cylindrical intermediate portion 16 of the rod 13, thus permitting insertion of the rod portion 13 into the sleeve 17 in generally tight fitting relationship as shown in FIG. 4. When positioned in this manner, the forward end of the bore 27 is spaced radially outwardly from the forward portion 19 of the rod 13. This space allows the split cylinder to be received between the portion 19 and the bore 27 as will be described below.

The forward portion 20 of the sleeve 17 includes a side wall having at least two openings 22, 22 to facilitate easy removal of wire cuttings and other particles resulting from use of the tool. In the preferred embodiment, these openings 22, 22 are positioned on diametrically opposite sides of the portion 20. The openings 22, 22 in the preferred embodiment extend through the wall of the portion 20 at about a 45° angle and communicate with the bore 27. As shown best in FIG. 4, the openings 22, 22 are generally aligned or matched with the beveled surfaces 18, 18 to improve the self cleaning feature of the tool. It is contemplated that the openings 22 could be of various shapes such as circular, or oval, or irregular shapes such as crescents, half circles, etc. It is also contemplated that the tool could have more than two openings, although it is believed that at least two such openings are necessary. It is contemplated that with larger tools, more than two holes could be advantageous.

Figure 3:
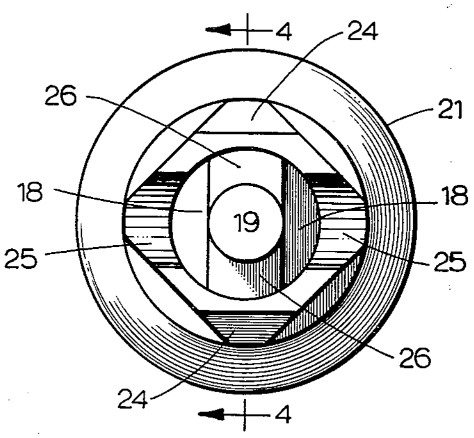
FIG. 3 is an elevational end view of the tip portion of the wire insertion tool of the present invention.
Figure 5:
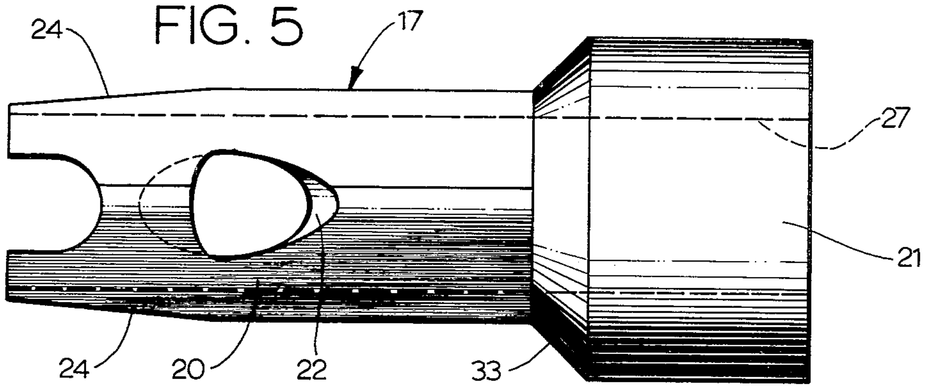
FIG. 5 is an elevational side view of the sleeve portion of the wire insertion tool of the present invention.

The forward end of the portion 20 includes a pair of wire receiving notches 25, 25 positioned on opposite sides of the portion 20. During use of the tool, these notches 25, 25 receive the wire to be inserted to properly align the wire and prevent it from slipping one way or the other relative to the tip 14 (FIG. 1) of the tool. As illustrated in the embodiment of FIGS. 2, 3 and 5, the forward end of the portion 20 can be beveled to provide a lead-in surface 24 to help guide the tool for insertion into the housing surrounding the split cylinder of FIGS. 8 and 9. The inner edges of the forward end of the portion 20 can also be beveled slightly to provide a lead-in surface into the split cylinder.

In the preferred embodiment, the notches 25, 25 serve as wire engaging portions of the sleeve. When the rod 13 and sleeve 17 sections are assembled in their operative positions, the wire engaging forward end of the rod portion 19 is generally in alignment with the wire engaging portion of the notches 25, 25.

Reference is next made to FIGS. 7, 8 and 9. FIG. 7 shows a split cylinder connector 29 mounted to the surface of a panel 37 while FIGS. 8 and 9 show a split cylinder connector 29 and housing 28 combination. Both embodiments are illustrative of the type of connectors with which the present tool is intended to be used. The split cylinder connector 29 of FIGS. 7, 8 and 9 includes an elongated, generally cylindrical member having an elongated wire receiving slot 30 extending longitudinally within the wall of the cylinder 29 and a cut-off edge 32. In FIG. 7 the cylinder 29 is mounted to a panel 37 while in FIGS. 8 and 9 the cylinder 29 is centrally disposed within a housing 28 which is constructed of an insulator material to prevent inadvertent contact or shorting of the cylinder 29. The housing in turn is connected to the panel 31. The housing 28 also includes a pair of wire receiving slots 34 and 35 positioned at opposite corners of the housing 28 and in general alignment with the slot 30 of the cylinder 29. To use the tool of the present invention, a wire illustrated in phantom in FIGS. 7, 8 and 9 by the reference numeral 36 is layed across the split cylinder 29 in the position shown. The tool is then positioned with the wire receiving notches 25, 25 in engagement with the wire and the forward wire engaging portion 19 (FIGS. 2-4) aligned with the central opening of the cylinder 29. An insertion force is then exerted on the end of the tool, thus forcing the wire 36 into the split cylinder 29. During this insertion, one end of the wire 36 is cut off by the cut off edge 32 and the portion of the wire 36 forced into the slot 30 is pierced by the edges of the slot 30, thus facilitating electrical contact between the cylinder and the conductor portion of the wire. When fully inserted, the wire is positioned as illustrated in phantom by the reference numeral 39.

The dimensions of the various portions of the rod 13 and sleeve 17, of course, are dictated by the dimensions of the particular split cylinder and housing configurations with which the tool is intended to be used. With a structure similar to that illustrated in FIG. 7, the outer cylindrical dimension of the forward portion 19 should be slightly smaller than the interior dimension of the split cylinder 29. Similarly, the inner cylindrical dimension of the bore 27 should be slightly larger than the outer cylindrical dimension of the split cylinder 29 so that during the insertion procedure the tool can be removed downwardly with respect to the split cylinder 29. In the embodiment of FIG. 7, the exterior dimension and configuration of the portion 20 has no particular limitation. In the embodiment of FIGS. 8 and 9, the outer dimension of the forward portion 19 and the inner dimension of the bore 27 are the same as described above. Additionally, the exterior dimension of the section 20 should be slightly smaller than the interior dimension of the housing 28 and the configuration should be the same to allow for insertion of the tool.

Although the description of the preferred embodiment has been quite specific, it is contemplated that various changes and modifications could be made without deviating from the spirit of the present invention. Accordingly, it is intended that the scope of the present invention be dictated by the claims rather than by the description of the preferred embodiment.

We claim:

1. A wire insertion tool usable for inserting a wire into a split cylinder connector comprising:

a forward rod portion having a longitudinal axis and a forward end for engagement with said wire, said wire being generally perpendicular to the longitudinal axis of said forward rod portion;

a hollow sleeve portion having a longitudinal axis generally parallel to the longitudinal axis of said forward rod portion, a side wall surrounding said forward rod portion and an elongated bore extending through at least a portion of said sleeve portion, said bore being spaced radially outwardly from said forward rod portion to define a generally annular space therebetween for receiving a portion of said split cylinder connector, said sleeve portion extending forward beyond the forward end of said forward rod portion, a pair of wire engaging notches disposed in the forwardmost end of said hollow sleeve portion and on opposite sides thereof for engaging and aligning said wire, the rearwardmost portion of each of said notches for engaging with the wire during said inserting; and at least a pair of closed loop openings disposed rearwardly of said forward end of said forward rod portion, said openings extending through said side wall and communicating with said bore for the purpose of removing wire scraps and the like which are generated during the insertion procedure.

2. The wire insertion tool of claim 1 having an opening extending through said side wall on opposite sides thereof and communicating with said bore.

3. The wire insertion tool of claim 2 including a rearward rod portion connected with said forward rod portion and having an outer dimension approximately equal to the inner dimension of said bore.

4. The wire insertion tool of claim 3 including a shoulder portion joining said forward rod portion and said rearward rod portion.

5. The wire insertion tool of claim 4 wherein said shoulder portion includes a pair of diametrically opposite flat surfaces disposed at generally right angles to the longitudinal axis of said forward rod portion and a pair of diametrically opposite beveled surfaces each sloping outwardly and rearwardly relative to said forward rod portion.

6. The wire insertion tool of claim 5 wherein said openings are disposed at an angle relative to the longitudinal axis of said rod portion such that said openings slope outwardly and rearwardly relative to said forward rod portion.

7. The wire insertion tool of claim 6 wherein each of said beveled surfaces is aligned with at least a portion of the inside surface of one of said openings.

8. The wire insertion tool of claim 7 wherein the angle of said beveled surfaces and the angle of said openings relative to said forward rod portion are about equal.

9. The wire insertion tool of claim 1 including a shoulder portion extending between said forward rod portion and said bore.

10. The wire insertion tool of claim 9 wherein said shoulder portion includes a pair of diametrically opposite flat surfaces disposed at generally right angles to the longitudinal axis of said forward rod portion and a pair of diametrically opposite beveled surfaces each sloping outwardly and rearwardly relative to said forward rod portion.

11. The wire insertion tool of claim 10 wherein said openings are disposed at an angle relative to the longitudinal axis of said rod portion such that said openings slope outwardly and rearwardly relative to said forward rod portion.

12. The wire insertion tool of claim 11 wherein each of said beveled surfaces is aligned with at least a portion of the inside surface of one of said openings.

13. The wire insertion tool of claim 1 wherein said openings are disposed at an angle relative to the longitudinal axis of said rod portion such that said openings slope outwardly and rearwardly relative to said forward rod portion.

14. The wire insertion tool of claim 2 wherein said openings are longitudinally aligned with said wire engaging notches.

15. A wire insertion tool usable for inserting a wire into a split cylinder connector comprising:

a forward rod portion having a longitudinal axis and a forward end for engagement with said wire, said wire being generally perpendicular to the longitudinal axis of said forward rod portion;

a hollow sleeve portion having a longitudinal axis generally parallel to the longitudinal axis of said forward rod portion, a side wall surrounding said forward rod portion and an elongated bore extending through at least a portion of said sleeve portion, said bore being spaced radially outwardly from said forward rod portion to define a generally annular space therebetween for receiving a portion of said split cylinder connector, said sleeve portion extending forward beyond the forward end of said forward rod portion;

a pair of wire engaging notches disposed in the forwardmost end of said hollow sleeve portion and on opposite sides thereof for engaging and aligning said wire, the rearwardmost portion of each of said notches for engaging with the wire during said said inserting; and at least one closed loop opening disposed rearwardly of said forward end of said forward rod portion, said opening extending through said side wall and communicating with said bore for the purpose of removing wire scraps and the like which are generated during the insertion procedure.

* * * * *